C. B. HAZARD.
HARVESTING MACHINE.
APPLICATION FILED JUNE 12, 1909.

1,051,579.

Patented Jan. 28, 1913.
7 SHEETS—SHEET 1.

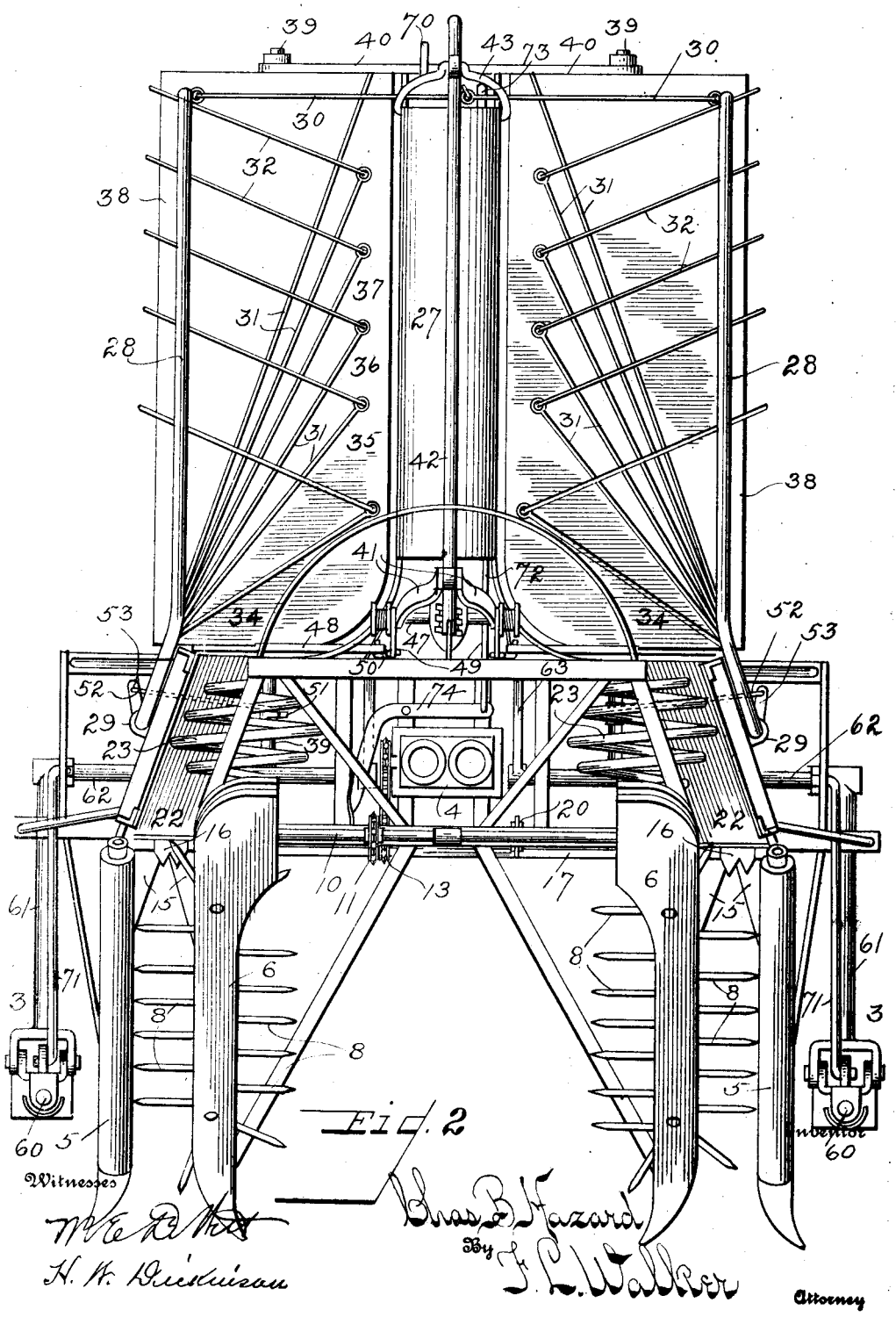

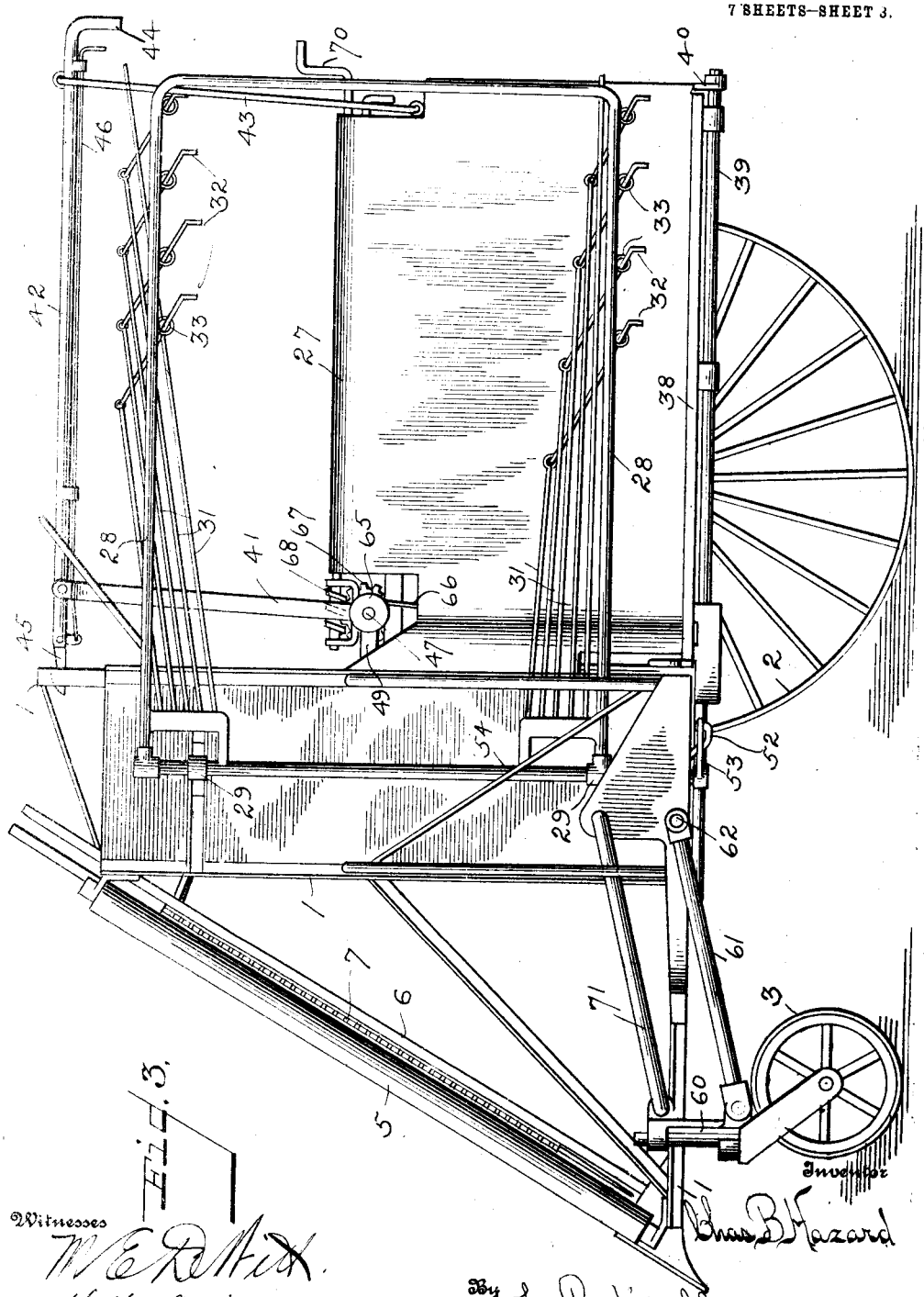

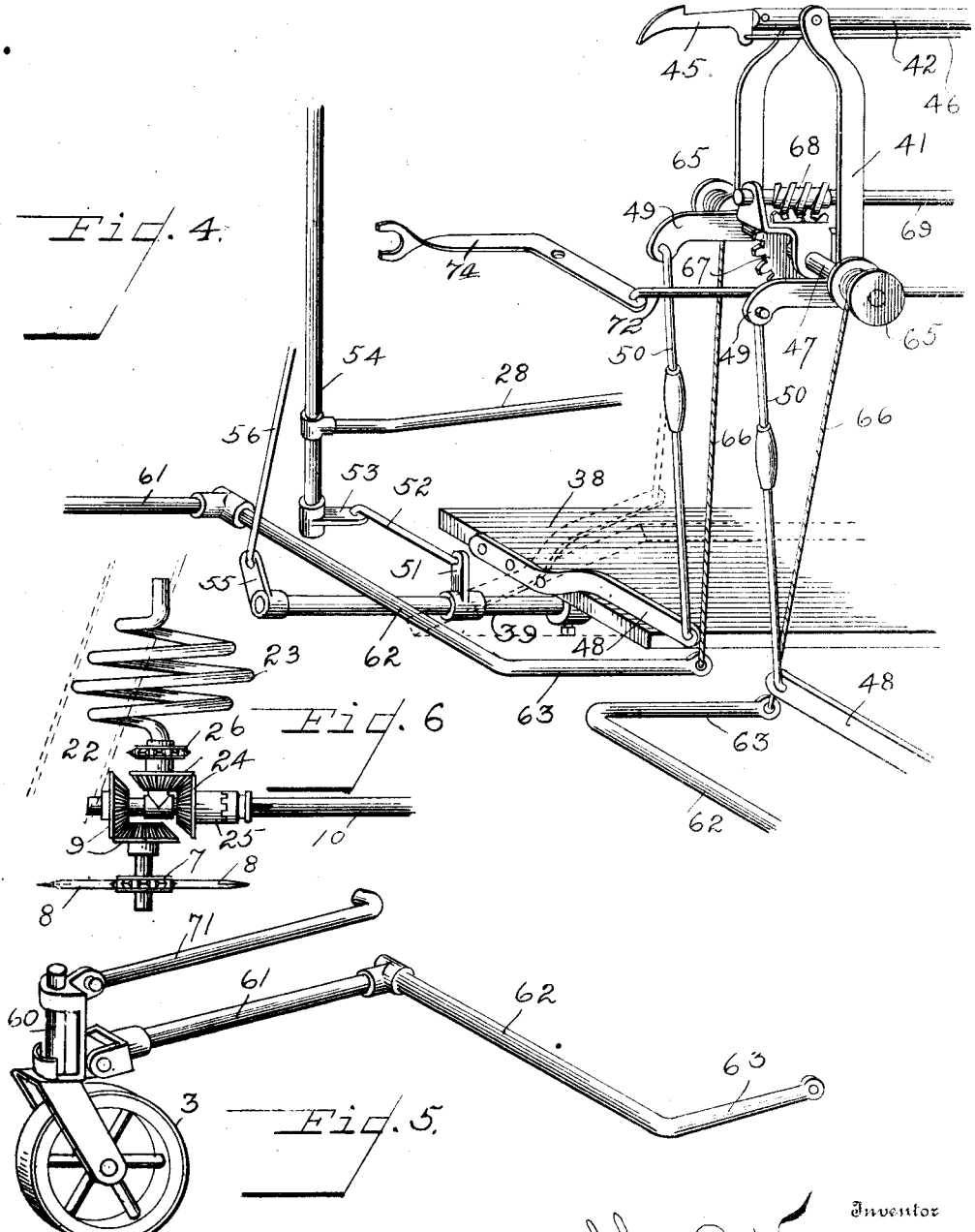

C. B. HAZARD.
HARVESTING MACHINE.
APPLICATION FILED JUNE 12, 1909.

1,051,579.

Patented Jan. 28, 1913.
7 SHEETS—SHEET 5.

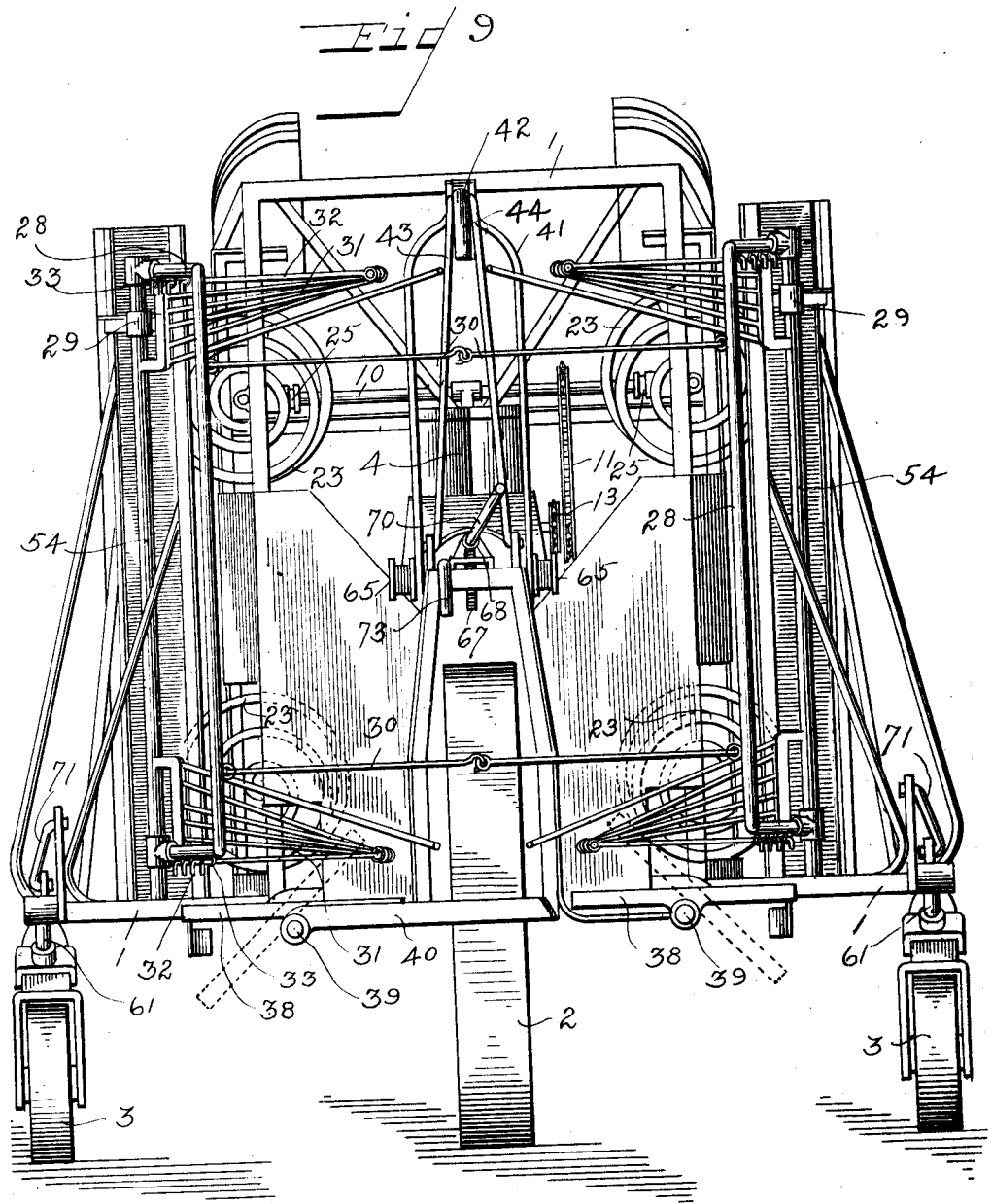

C. B. HAZARD.
HARVESTING MACHINE.
APPLICATION FILED JUNE 12, 1909.
1,051,579.
Patented Jan. 28, 1913.
7 SHEETS—SHEET 7.
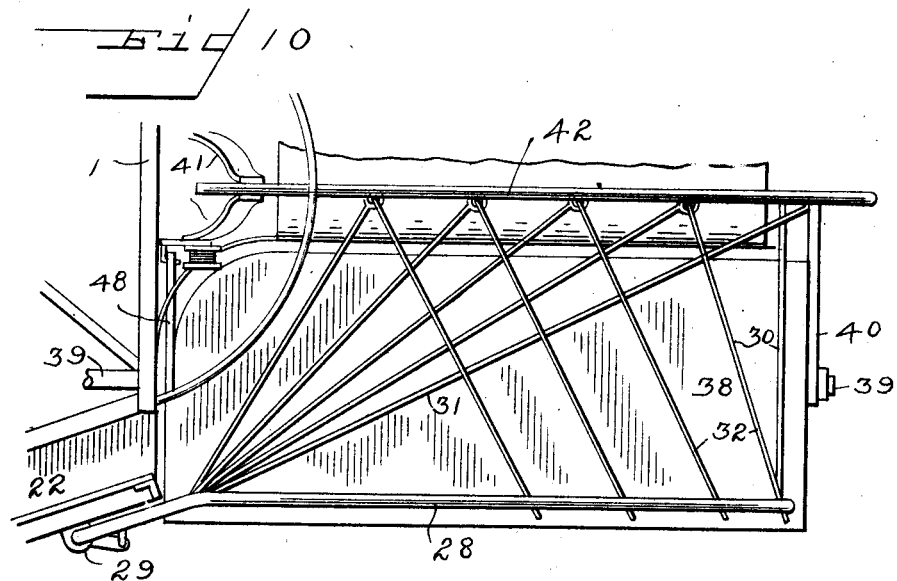
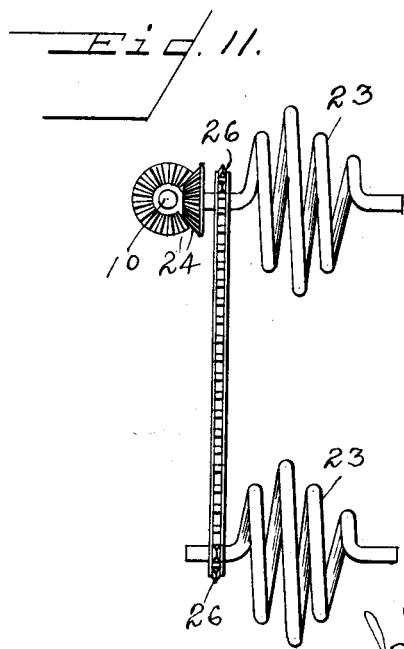

UNITED STATES PATENT OFFICE.

CHARLES B. HAZARD, OF NEAR XENIA, OHIO.

HARVESTING-MACHINE.

1,051,579.  Specification of Letters Patent.  Patented Jan. 28, 1913.

Application filed June 12, 1909. Serial No. 501,811.

*To all whom it may concern:*

Be it known that I, CHARLES B. HAZARD, a citizen of the United States, residing near Xenia, in the county of Greene and State of Ohio, have invented certain new and useful Improvements in Harvesting-Machines, of which the following is a specification.

My invention relates to corn harvesters, and particularly to shocking devices adapted to receive the several stalks of corn and adapted to discharge the corn when a predetermined quantity has been collected.

The object of the invention is to simplify the structure as well as the means and mode of operation of such devices whereby they will not only be cheapened in construction but will be more efficient in use, easily operated and unlikely to get out of repair.

A further object of the invention is to provide an improved packing device for the severed stalks, improved means of distributing the severed stalks in the receiving compartment, and for discharging the severed stalks when the compartment has been filled.

A further object is to provide improved means for actuating the various operating and interengaging parts.

With the above primary and other incidental objects in view as will more fully appear in the specification, the invention consists of the features of construction the parts and combinations thereof, the mode of operation or their equivalents, as hereinafter described and set forth in the claims.

Figure 1:
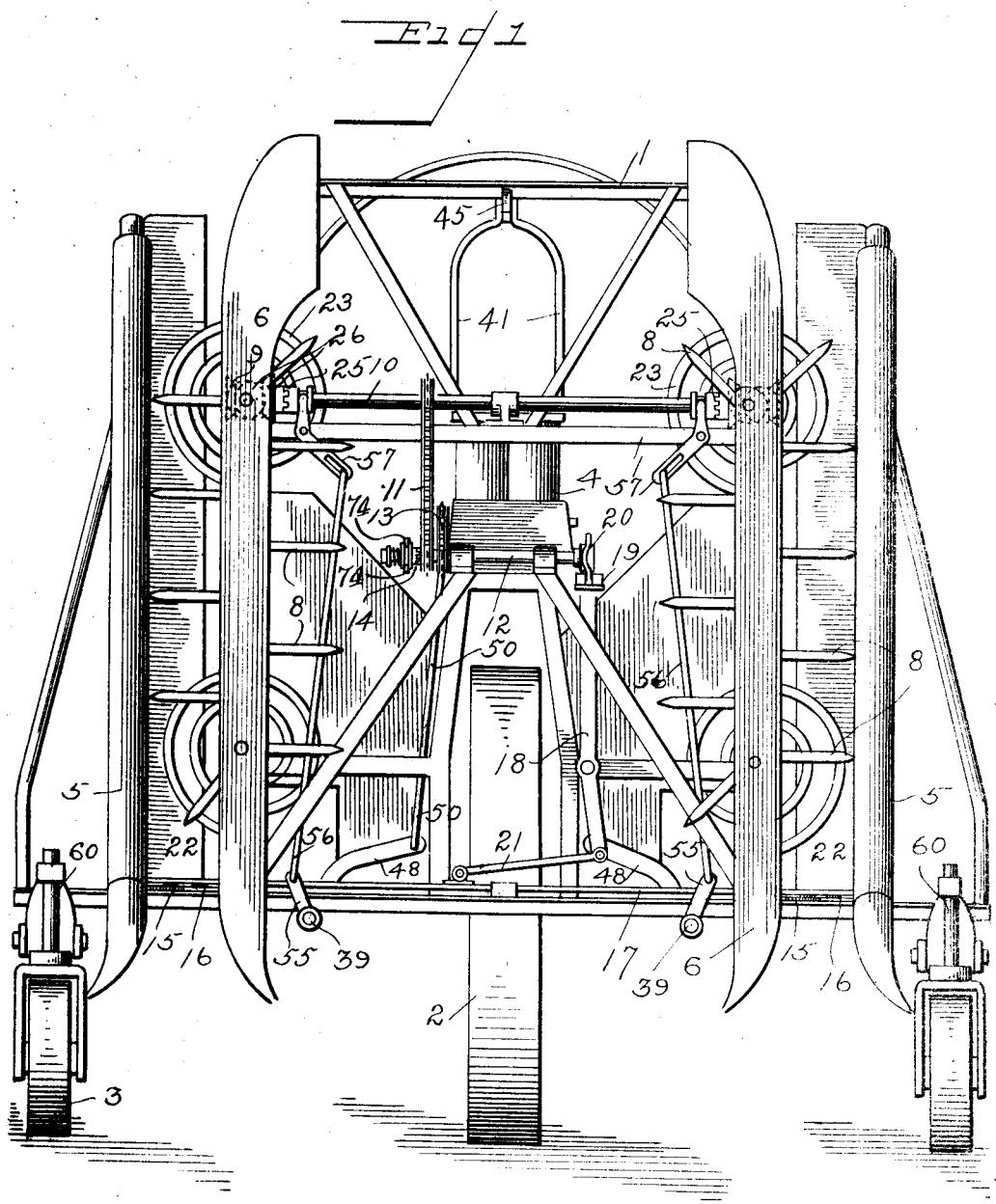
Figure 7:
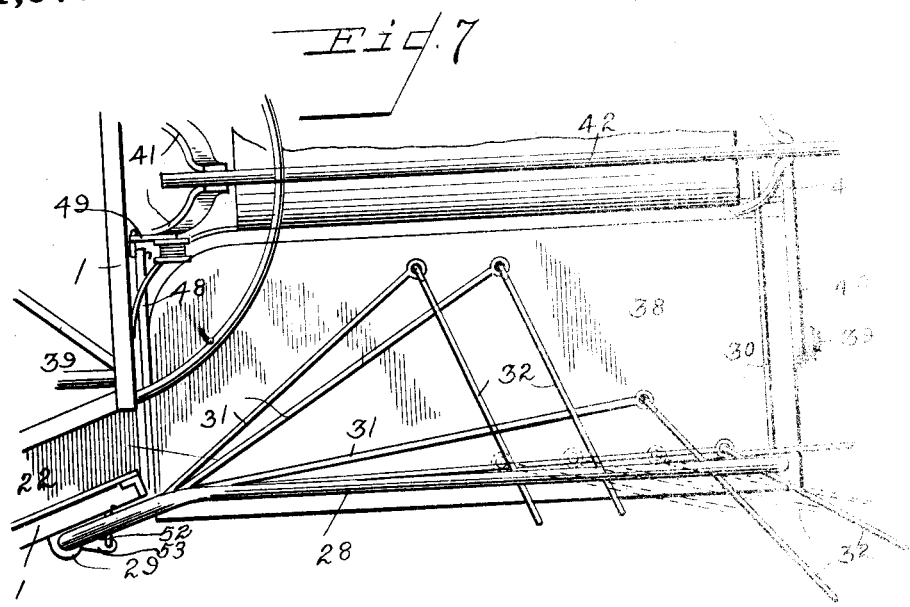
Figure 8:
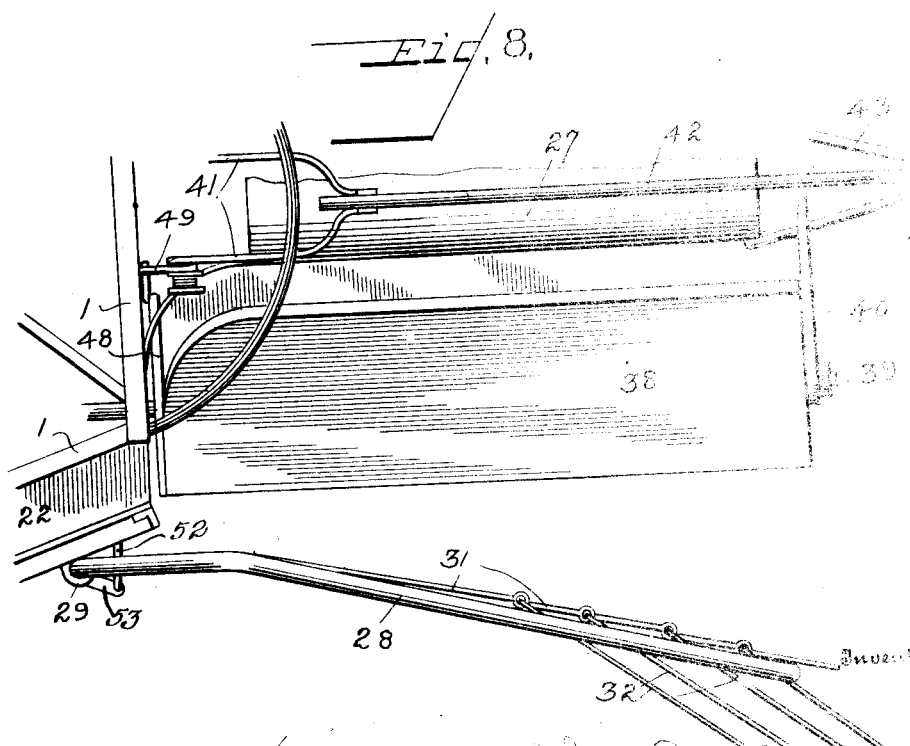

In the drawings, Figure 1 is a front elevation of the assembled machine. Fig. 2 is a top plan view. Fig. 3 is a side elevation. Fig. 4 is a detail perspective view of the various operating parts removed from the supporting frame, illustrating the interengagement of the parts. Fig. 5 is a detail perspective view of one of the outrider wheels and the adjusting connections of the same. Fig. 6 is a detail plan view of one of the helical packers and the driving connections thereof. Fig. 7 is a detail plan view of one of the receiving compartments showing the relation of the parts when the compartment is partially filled. Fig. 8 is a plan view similar to Fig. 7 showing the relation of the parts at the time of the discharge of the load. Fig. 9 is a rear elevation of the complete machine. Fig. 10 is a detail plan view of a modification of the spring presser arm construction. Fig. 11 is a detail view of the driving connection between the upper and lower packers.

Like parts are indicated by similar characters of reference throughout the several views.

The machine comprises a main frame preferably formed of angle irons and supported on three carrying wheels, a main carrying wheel 2 centrally located, and two swivel outrider wheels 3 located adjacent to the forward portion of the machine.

The machine is adapted to harvest two rows of standing corn at the same time, the main carrying wheel being adapted to travel between said rows and the swivel wheels at the outer sides of said rows. The wheels 2 and 3 are carrying wheels only.

The machine is adapted to be drawn by horses or similarly propelled while the operating parts are actuated by a gasolene or other motor 4 carried on the machine and driving said parts independent of the carrying wheels.

At the forward portion of the machine there are provided forwardly and downwardly extending dividers adapted to engage the stalks of corn and guide them to the cutting device. The outermost dividers comprise rollers 5 journaled in the main frame. These rollers are not power driven but are adapted to yield when engaged by the stalks of corn. The innermost dividers 6 comprise a frame composed of two parallel boards between which are mounted sprocket wheels over which travel sprocket chains 7 carrying spikes or fingers 8 adapted to engage and lift the fallen stalks of corn. The sprockets and their sprocket chains 7 and therewith the spikes 8 are continuously driven by means of bevel gears 9 (see Fig. 6) one of which is secured upon a drive shaft 10. The drive shaft 10 is driven by means of a belt or sprocket chain 11 engaging suitable sprockets from a countershaft 12 journaled in bearings on the main frame; the countershaft 12 being driven by means of sprockets and chain 13 or by a belt from the motor 4. Located on the countershaft 12 is a clutch 14 normally engaged with the drive sprocket, driving the shaft 10 but adapted to be disengaged therefrom by means hereinafter described whereby the shaft 10 and the parts actuated thereby may remain at rest.

Located on the main frame intermediate the dividers 5 and 6 are the cutting devices comprising stationary blades 15 and reciprocating V-shaped cutting blades 16. The reciprocating cutting blades 16 at the opposite sides of the machine are secured to a reciprocating bar 17 mounted in suitable bearings on the main frame whereby the cutting blades move in unison. These cutting blades are best shown in Fig. 2. To reciprocate the cutter bar 17 there is pivoted to the main frame a lever 18 (see Fig. 1) bifurcated at its upper extremity or provided with rollers 19, which rollers form a bifurcation. Carried on the countershaft 12 is a cam member 20 engaging the bifurcated upper extremity of the pivoted lever 18. The cam member 20 upon its rotation with the shaft 12 is adapted to oscillate the lever 18 upon its pivotal connection. At its lower extremity the lever 18 is connected by a link 21 with the cutter bar 17 whereby each oscillation of the lever 18 will cause a reciprocatory movement of the cutter bar and thereby a corresponding movement of the movable cutter blades 16; the stalks of corn having been elevated and held by the spikes 8 during the cutting operation and having been severed by the blades 16 pass into the restricted passage 22 which leads from the cutting device to the receiving compartment. While in the passage 22 the stalks of corn are engaged by the helical packers 23 which project through the inner wall of the passage 22 and substantially across said passage. The packers 23 are in the form of a double conical helix pivotally supported in the main frame; that is, the packers are helical in form and are of greater diameter at their central point than toward either end, thus increasing gradually from the forward end toward the center then decreasing from the center toward their rear end. This will be seen more clearly in Fig. 8. The packers 23 are angular or non-parallel in their relation to the passages 22. This permits the driving connection including the pinions 24 and sprocket wheels 26 and corresponding sprocket chain as hereinafter referred to, to be located beyond the wall of the passage and at a point some distance removed therefrom whereby the severed stalks or the blades thereof can not become entangled in the driving mechanism. In order that the peripheries of the packers may extend parallel throughout a portion of their length with the outermost wall of the passage, the rear portion of each packer is tapered or conical. The angular arrangement of the packer and the passage provides a converging entrance to the passage between the periphery of the forward portion of the packer and the side of the passage, even in the event that the forward portion of the packer is formed straight or cylindrical; however to increase the angle of convergence of the mouth or entrance of the passage, the helical packers are preferably tapered or formed conical at their forward portion as shown in the drawings, thus providing for more easy ingress of the severed stalks. The packers 23 are four in number two located on each side of the machine. One of each pair of packers is adjacent to the upper portion of the frame and the other of the pair is in the lower portion of the frame. The packers 23 are revolubly driven from the shaft 10 by means of a pair of bevel gears 24, one of the gears 24 being loosely mounted on the shaft 10 and engaged therewith by a clutch 25 whereby said packers 23 may be disengaged and the shaft 10 rotated independent of the packers. The upper packer member of each pair is thus driven directly from the drive shaft 10. The lowermost packer on each side of the machine is driven from and in unison with the upper packer by means of a sprocket chain passing over sprocket wheels 26 on the shafts of the respective helical packers. The severed corn is moved through the passage way 22 and into the receiving compartment in the rear thereof by the screw like action of the helical packers. The rear portion of the machine is divided centrally by a vertically disposed housing 27 inclosing the central carrying wheel 2. On either side of the housing 27 is a receiving compartment, the outer sides of which are formed by pivotally mounted frames 28 journaled in suitable bearings 29 on the main frame. The pivotal frames 28 are connected at their rear extremities by link rods 30 which forms the rear closure of the compartment and holds the frames 28 in normal position. Carried on the frames 28 are a plurality of resilient spring arms 31. Pivotally connected with the extremity of the spring arms 31 are rods or links 32 which extend through loops or bearing rings 33 on the frame 28 and are adapted to reciprocate in said bearings. As the severed corn is forced back into the receiving compartment it first fills the space 34 and thence successively into the small spaces 35, 36, and 37 there being less resistance to the movement of the severed stalks from each space to the next succeeding one than would be required to cause the flexible spring arms 31 to be forced outward. When the severed stalks have reached the rear end of the compartment in a position adjacent to the center housing the continued forcing back of the severed stalks gradually forces the outermost spring arm 31 or that extending farthest rearward outward to compensate for the increased quantity of severed stalks. The remaining spring arms 31 are gradually forced outward and in turn as shown more particularly in Fig. 7 in which the two outermost spring arms have been flexed to their limit, the third spring arm almost to the limit, and the remaining two arms still in normal position. It will be seen that the spring arms 31 thus keep the severed stalks compact while in the receiving compartment and serve to hold them in upright position. The severed stalks contained in the receiving compartment, whether a large or small quantity, are always under pressure of the spring arms. When the compartment has been filled the spring arms and their links will assume the position shown in dotted lines in Fig. 7. It then becomes necessary to discharge the load of severed stalks.

The bottom sections 38 of the receiving compartment are each supported on an oscillating shaft 39 supported at its forward end in bearings in the main frame and provided at its rearward end with bearings in arms 40 projecting laterally from the central housing 27. In discharging the load from the receiving compartment the link bars 30 at the rear of the machine are disconnected and the side frames 28 are swung outward about their pivotal connections 29 to release the load of stalks and the bottom sections 38 are oscillated or inclined simultaneously with the movement of the frames 28 to discharge the load outward. To cause this movement of said parts there is provided on the frame of the machine adjacent to the forward end of the central housing 27 pivoted bell levers 41. Said levers are pivotally connected at their upper extremity with a reciprocating rod 42 extending rearward immediately above the housing 27 and supported at its rear end by pivoted arms 43. The rear end of the rod 42 is turned downward at at 44 to form a handle or grip and at its forward end it carries a pivoted latch member 45 engaging one of the transverse bars of the main frame 1 to hold the bell levers 41 and the pivoted arms 43 in their normal position. Extending rearward from the latch 45 to a point adjacent to the handle 44 and supported in suitable keepers on the rod 42 is a latch rod or link 46 by which the latch 45 may be disengaged from the frame by the operator at the rear of the machine. When so disengaged, the reciprocating rod 42 is pulled rearward which oscillates the bell levers 41 on their pivotal shaft 47. Each of the bottom sections 38 of the receiving compartment is provided with a projecting arm 48 best shown in Fig. 4. The lateral arm 49 of the bell lever 41 is connected by a link 50 with the projecting arm 48 of the corresponding bottom section 38 of the receiving compartment and upon the oscillation of the bell lever 41 by the rearward movement of the rod 42 the bottom section 38 is oscillated to an inclined position as shown in dotted lines in Fig. 4 discharging the load of severed stalks carried thereby outward. The oscillation of the bottom section 38 which is secured to the supporting shaft 39 causes a corresponding oscillation of said shaft. The supporting shaft 39 carries a rock arm 51 connected by a link 52 with a rock arm 53 upon the pivotal shaft 54 of the side frames 28. The movement of the supporting shaft 39, due to the oscillation of the bottom section 38, operates through the rock arms 51 and 53 and link 52 to cause a simultaneous outward oscillation of the side frame 28 to the position shown in Fig. 8. In Fig. 8 the bottom section is shown in its inclined or operated position and the side frame in its outermost position as at the time of the discharge of the load from the compartment. There is also carried on the supporting shaft 39 a rock arm 55 connected by a link 56 with a pivoted shift lever 57 supported on the main frame and adapted to move the clutch 25 to and from operative position. The construction is such that at the time the load is discharged from the receiving compartment by the oscillation of the bottom and outward movement of the side frame the helical packers 23 will be automatically disconnected from the driving mechanism and will remain at rest until the parts have again been returned to normal position. After the load has been discharged, it is necessary to advance the machine a short distance to clear it from the discharged stalks before the parts may be returned to normal position. Any corn which is cut during this limited forward movement, while the parts are in discharging position, will be collected in the passage 22, but inasmuch as the packers 23 are in-operative through the disengagement of the clutch 25, such stalks will not be advanced through the passage 22 and the receiving compartment until the parts are again in normal position. To return the parts to normal position, the operator pushes the reciprocating rod 42 forward until the latch 45 again engages the transverse bar of the frame. This forward movement of the rod 42 oscillates the bell levers 41 which, through the connecting link 50 returns the bottom sections 38 to normal position, at the same time oscillating the longitudinal shaft 39 on which the bottom section 38 is rigidly secured. The oscillation of the shaft 39 operates through the rock arms 51 and 53 and link 52 to simultaneously return the side frames 28 to normal position and also cause the reëngagement of the clutch 25 by means of the shift lever 57 operated by the link 56 and rock arm 55. The link bars 30 at the rear of the machine are then reengaged and the machine is ready to proceed as before.

The machine is adjustable for severing corn at different heights from the ground by adjustment of the outrider wheels 3, the frame of the machine tilting on the main carrying wheel 2. The outrider wheels 3 are provided with swivel connections 60 pivoted to the forward end of an arm 61 projecting forwardly from a transverse shaft 62 journaled in the main frame. At its inner end the transverse shaft 62 is provided with a rearward extending arm 63. It is to be understood that there is a transverse shaft 62 and a rearward extending arm 63 on each side of the machine. Carried on a transverse revoluble shaft 47 located in the upper forward portion of the central housing 27 and preferably the same shaft upon which are pivoted the bell levers 41, are winding drums 65. Cables 66 are carried on said winding drums 65 and are attached to the rearward extending arms 63. Also carried on the shaft 47 is a worm wheel 67 engaged by a worm 68, on the extremity of a shaft 69 extending rearward within the housing 27. At its rear extremity the shaft 69 is provided with a crank 70. By the rotation of the shaft 69, the winding drums 65 are rotated, winding the cables 66 thereon, and thereby oscillating the transverse shaft 62 in their bearings in the main frame, the wheel supporting arm 61 being rigidly connected with the transverse shaft 62 will cause the forward portion of the machine to be elevated upon said operation of the parts.

Pivotally connected with the swivel head 60 of the outrider wheel 3 and also with the main frame is a compensating link 71 extending parallel with the supporting arms 61 and serving to maintain the swivel head 60 always in vertical position.

Extending through the housing 27 is a reciprocating rod 72 having a handle 73 formed at its rear extremity and at its forward end being connected with the pivoted shifting lever 74 carried on the main frame and engaging the main driving clutch 14 (see Figs. 1 and 2). By reciprocating the rod 72 the operator may, at any time, from the rear of the machine, disconnect the driving motor 4 from the operating mechanism.

In the drawings, the spring arms 31 have been shown as extending substantially across the receiving compartment but not entirely so. However, in practice it is preferable to extend these spring arms 31 to the central housing 27, the upper series of spring arms being preferably extended even beyond the housing and substantially to a point in alinement with the reciprocating rod 42. This is especially desirable if the corn is not luxuriant but the stalks thin and light.

While the machine herein described is referred to as a corn harvester, it is to be understood that it is not limited to such use but may be employed for harvesting other growths. I therefore do not limit myself to its use for harvesting corn but claim the broad and general application of the mechanism within the limits of the appended claims.

While the various operating parts have been described as actuated by the motor 4, it is obvious that either the shaft 10 or 12 might be driven from the carrying wheels in any of the well known manners by sprocket chains or shafts and gears which is so obvious as to require no illustration, in which case the motor may be omitted.

From the above description it will be apparent that there is thus provided a machine of the character described, possessing the particular features of advantage before enumerated as desirable, but which obviously is susceptible of modification in its form, proportion, detail construction and arrangement of parts, without departing from the principle involved, or sacrificing any of its advantages.

Having thus described my invention I claim:

1. In a machine as described, the combination with a main frame and conveying and receiving mechanism, of duplicate sets of stationary and movable cutting blades, a reciprocating cutter bar connecting the sets of movable blades, a pivoted operating lever carried on the frame, a link connecting said lever with said cutter bar, a revoluble shaft, a cam carried by said shaft and engaging said pivoted lever whereby said lever will be oscillated to reciprocate said cutter bar and movable cutting blades, and a motor actuating said cam independent of the carrying wheels, substantially as specified.

2. In a harvesting machine, the combination with a main frame, and cutting and receiving mechanism, of a passage through which the severed stalks are moved to the receiving compartment, revoluble helical packers having their axes of rotation located beyond a wall of the passage and their peripheries projecting into said passage and engaging the stalks therein to move the stalks through the passage, and means to rotate said helical packers.

3. In a machine as described, the combination with a main frame and cutting and receiving mechanism, of double-conical helical packers engaging the severed stalks and conveying them from the cutting to the receiving mechanism, substantially as specified.

4. In a machine as described, the combination with a main frame and cutting and receiving mechanism, of revoluble helical packers, said packers being of greater diameter at their central portion and decreasing in diameter gradually toward either extremity, and means to rotate said packers, substantially as specified.

5. In a harvesting machine, a main frame, cutting mechanism, a receiving compartment, a passage through which the severed stalks are carried to the receiving compartment, revoluble helical packers, the axes of rotation of which are angularly arranged in relation to the path of travel of the stalks through the passage, the said packers being adapted to engage the severed stalks and move them through the passage into the receiving compartment, and means for rotating the packers.

6. In a harvesting machine, a main frame, cutting and conveying mechanism, a receiving compartment into which the severed stalks are received in upright positions, a tilting bottom for said compartment upon which the upright stalks rest, a swinging side wall for the compartment separate from the tilting bottom, and means to simultaneously tilt the bottom and swing the side wall to discharge the contents of the compartment.

7. In a harvesting machine, a main frame, cutting and conveying mechanism, a receiving compartment having a longitudinal wall dividing the compartment into two divisions, a movable bottom section and a movable exterior side section for each of the divisions of the compartments, and means for simultaneously moving the bottom sections and movable side sections of both divisions to discharge the contents of the compartment.

8. In a machine of the character described, the combination with a main frame and cutting and conveying mechanism, of a receiving compartment, a rock shaft, a bottom section secured upon and movable with said rock shaft, an arm carried by said shaft, a bell lever carried on the main frame and connected to said arm, a reciprocating bar attached to the bell lever and extending to the rear of the machine whereby the bell lever may be operated from the rear of the machine to rock said shaft and thereby tilt the bottom section to discharge the load, substantially as specified.

9. In a machine of the character described, the combination with cutting and conveying mechanism, of a receiving compartment, a tilting bottom therefor, means for operating the bottom to release the load and means for automatically disconnecting the conveying mechanism upon the operating of the bottom whereby the conveying mechanism will remain at rest until the bottom is restored to normal position, substantially as specified.

10. In a machine of the character described, the combination with cutting and conveying mechanism, of a receiving compartment, a swinging side wall therefor, means for operating the swinging wall to release the load and means for automatically disconnecting the conveying mechanism upon the operation of the swinging side wall whereby the conveying mechanism will remain at rest until the side wall is restored to normal position, substantially as specified.

11. In a machine of the character described, the combination with a main frame, cutting and conveying mechanism, of a receiving compartment, a rock shaft, a bottom section for the compartment mounted on said shaft and movable therewith, an arm carried by said shaft, a pivotally supported side wall for said compartment, a link connecting said side wall with said arm, and means to rock said shaft whereby the bottom section and side wall will be simultaneously operated, substantially as specified.

12. In a machine of the character described, the combination with a main frame, cutting and conveying mechanism, of a receiving compartment, a rock shaft, a bottom section for the compartment mounted on said shaft and movable therewith, an arm on said shaft, a clutch, actuating devices connected thereby with the conveying mechanism, a shifting lever engaging the clutch, a link connecting the shifting lever and arm whereby the movable bottom section and connecting clutch of the conveying mechanism will be simultaneously operated, substantially as specified.

13. In a harvesting machine, a main frame, cutting and conveying mechanism, a receiving compartment, a plurality of spring arms inclined rearward within the compartment and diverging from a substantially common point, said arms being adapted to maintain the severed stalks upright.

14. In a harvesting machine, a main frame, cutting and conveying mechanism, a receiving compartment, a plurality of resilient arms of different resistance projecting within the compartment, said arms being adapted to bear upon the severed stalks, the rearmost arms yielding with less pressure than the forward arms, said arms being adapted to guide the severed stalks to the rear of the compartment, the shock being formed initially at the rear of the compartment and expanding in a forward direction.

15. In a machine of the character described, the combination with a main frame, cutting and conveying mechanism and a receiving compartment, of a plurality of spring arms projecting within said compartment, and forming a restricted passage through which the severed stalks may move to the rear of the compartment, the flexing resistance of said arms being greater than the resistance to the movement of the stalks through the passage thereby causing the rear portion of the compartment to be filled first, substantially as specified.

16. In a harvesting machine, a main frame, cutting and conveying mechanism, a receiving compartment, a variable passage way leading to the rear of the compartment through which the severed stalks are moved, said passage way being more yielding as it progresses toward the rear of the compartment whereby the passage way will expand beginning at its rearmost extremity to compensate for the increasing collection of stalks.

17. In a machine as described, the combination with cutting and conveying mechanism, of a receiving compartment, a movable side therefor, spring arms attached to said side and movable therewith, said arms being adapted to bear upon the severed stalks within the compartment and to be withdrawn from engagement with the stalks upon the operation of said movable side, thereby releasing the stalks, substantially as specified.

18. In a machine as described, the combination with cutting and conveying mechanism, of a receiving compartment, spring arms projecting within the compartment, rods connected with the spring arms and provided with bearings in the side of the compartment through which they will reciprocate upon the flexing of the arms, substantially as specified.

19. In a machine as described, the combination with cutting and conveying mechanism, of a receiving compartment, spring arms projecting angularly within said compartment and forming therein a restricted passage through which the severed stalks will pass to the rear of the compartment, said arms being adapted to yield as the collection of severed stalks increases, substantially as specified.

20. In a machine as described, the combination with cutting and conveying mechanism, of a receiving compartment, two series of yielding spring arms arranged in different planes and projecting within the compartment, said arms being adapted to bear upon the severed stalks and means for withdrawing the said arms to release the stalks, substantially as specified.

21. In a harvesting machine, a main frame, cutting and conveying mechanism, a receiving compartment, guiding means whereby the severed stalks will be guided toward the rear of the compartment, said guiding means being movable from the path of the collected stalks beginning at the rear of the compartment and progressing forward as the collection of stalks expands in a forward direction.

22. In a harvesting machine, a main frame, cutting and conveying mechanism, a receiving compartment, yielding guiding means for guiding the severed stalks to the rear of the compartment, the resistance of said guiding means being least at the rear of the compartment and greatest at the front thereof and means for releasing the collected stalks from the compartment.

23. In a harvesting machine, a main frame, cutting and receiving means, a passage through which the stalks are conveyed, a helical conveyer, the axis about which the successive turns of the helix are described being inclined to the stalk passage, substantially as specified.

24. In a harvesting machine, a main frame, cutting and receiving means, a passage through which the stalks are conveyed, a helical conveyer mounted beyond the wall of the passage and extending therethrough into the passage, whereby the severed stalks will be separated from the driving mechanism of the helical conveyer by the intervening wall of the passage.

In testimony whereof, I have hereunto set my hand.

CHARLES B. HAZARD.

Witnesses:
HARRY F. NOLAN,
F. L. WALKER.